United States Patent [19]

Himmele et al.

[11] 3,862,235
[45] Jan. 21, 1975

[54] PENT-4-EN-1-ALS AND THEIR PRODUCTION

[75] Inventors: Walter Himmele, Walldorf; Werner Hoffmann, Ludwigshafen, both of Germany

[73] Assignee: Badische Anilin- & Soda-Fabrik Aktiengesellschaft, Ludwigshafen/Rhein, Germany

[22] Filed: Oct. 8, 1970

[21] Appl. No.: 79,301

[30] Foreign Application Priority Data
Oct. 15, 1969   Germany...................... 1951881

[52] U.S. Cl........... 260/598, 252/522, 260/410.9 R, 260/483, 260/599 R, 260/601 R, 260/602
[51] Int. Cl....................... C07c 47/38, C07c 47/20
[58] Field of Search................. 260/601 R, 598, 602

[56] References Cited
UNITED STATES PATENTS

| 1,873,430 | 8/1932 | Knorr et al. ........................ 260/598 |
| 3,453,317 | 7/1969 | Marbet et al. ................... 260/601 R |
| 3,493,619 | 2/1970 | Marbet et al. ................... 260/601 R |
| 3,574,715 | 4/1971 | Marbet et al. ................... 260/601 R |

*Primary Examiner*—Joseph E. Evans
*Assistant Examiner*—D. B. Springer
*Attorney, Agent, or Firm*—Johnston, Keil, Thompson & Shurtleff

[57] ABSTRACT

A process for the production of pent-4-en-1-als which comprises reacting an allyl alcohol with an α-formyl-carboxylic ester at a temperature of from 100° to 350°C. Pent-4-en-1-als are perfumes and have a fresh fruity odor.

3 Claims, No Drawings

PENT-4-EN-1-ALS AND THEIR PRODUCTION

BACKGROUND OF THE INVENTION

This invention relates to pent-4-en-1-als and to a process for the production of pent-4-en-1-als by reaction of substituted allyl alcohols with α-formylcarboxylic esters.

It is known from German Patent Specification No. 1,193,490, that pent-4-en-1-als are obtained by reaction of substituted allyl alcohols with vinyl ethers. The process has the disadvantage however that in order to achieve useful results acid catalysts have to be used. These acid catalysts cause a resinification of the sensitive starting materials. Moreover it is necessary to carry out the process at superatmospheric pressure and this means added industrial expenditure.

It is an object of this invention to provide a process in which resinification of the starting materials does not take place. It is another object of the invention to provide a process which proceeds with good yields.

In accordance with this invention these and other objects and advantages are achieved in a process for the production of pent-4-en-1-als having the general formula:

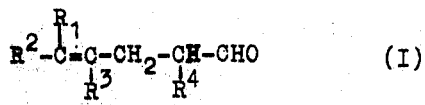

in which $R^1$ and $R^3$ each denotes a hydrogen atom or, like $R^2$, a hydrocarbon radical having one to forty carbon atoms which may contain oxygen atoms as heteroatoms, $R^1$, $R^2$ and $R^3$, in each case in pairs together with the carbon atoms which bear them as substituents, may form five-membered to seven-membered rings, and $R^4$ denotes alkyl, are obtained advantageously by reacting an allyl alcohol having the general formula:

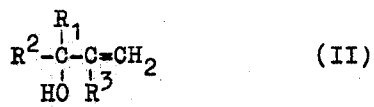

in which $R^1$, $R^2$ and $R^3$ have the meanings given above at a temperature of from 100° to 350°C with an α-formylcarboxylic ester having the general formula:

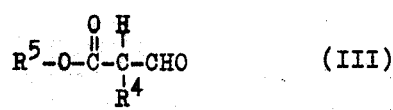

in which $R^4$ has the meaning given above and $R^5$ denotes alkyl.

Preferred starting materials (II), and consequently preferred end products (I), are those in which $R^1$ and $R^3$ each denotes a hydrogen atom or, like $R^2$, denotes an aliphatic hydrocarbon radical having 1 to 32 carbon atoms, a five-membered to eight-membered cycloaliphatic hydrocarbon radical having up to 8 carbon atoms, or an araliphatic radical having up to 8 carbon atoms, particularly benzyl, phenyl or naphthyl. The said radicals may contain oxygen atoms as heteroatoms, for example as hydroxyl groups, alkoxy groups or carbalkoxy groups, particularly one or two alkoxy groups having one to four carbon atoms. Moreover $R^1$, $R^2$ and $R^3$, in each case in pairs, together with the carbon atoms which bear them as substituents, may denote a six-membered ring in the preferred starting materials (II). In particularly preferred starting materials (II), $R^1$ and $R^3$ each denotes a hydrogen atom or, like $R^2$, denotes an aliphatic hydrocarbon radical having 1 to 32 carbon atoms and which may contain one or two alkoxy groups having 1 to 4 carbon atoms as substituents. Those starting materials (II) have acquired special industrial importance in which $R^1$ denotes a methyl group, $R^3$ denotes hydrogen and $R^2$ denotes a group having the general formula:

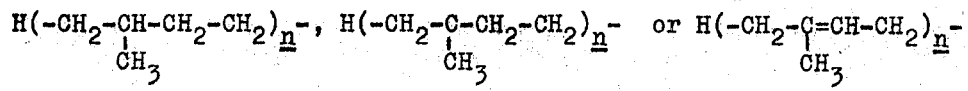

in which $n$ denotes an integer from 1 to 8. Examples of suitable starting materials are linalool, nerolidol, isophytol, vinylionol, 1-vinylcyclohexanol-(1), 4-ethyloct-1-en-3-ol, but-1-en-3-ol, 3-phenylprop-1-3n-3-ol, 3-methylpent-1-en-3-ol, 2,3-dimethylbut-1-en-3-ol, 3,7-dimethyl-7-hydroxyoct-1-en-3-ol, 3,7-dimethyl-7-acyloxyoct-1-en-3-ols, 3-carethoxybut-1-en-3-ol and 3,7-dimethyl-7-ethoxyoct-1-en-3-ol.

$R^4$ in the preferred starting materials (III) denotes alkyl having 1 to 12 carbon atoms, particularly alkyl having 1 to 4 carbon atoms. $R^5$ in the preferred starting materials (III) denotes alkyl having 1 to 4 carbon atoms. Examples of suitable starting materials (III) are: methyl α-formylpropionate, butyl α-formylpropionate, methyl α-formylbutyrate, butyl α-formylbutyrate, and methyl α-formyloctanecarboxylate. These α-formylcarboxylic esters are known or can be prepared in a simple way for example by hydroformylation of the corresponding α,β-unsaturated carboxylic esters according to the oxo reaction.

The reaction is carried out at a temperature of from 100° to 350°C. Particularly good results are obtained when temperatures of from 120° to 220°C are used. The reaction is generally carried out at atmospheric pressure. It is also possible however to use pressures of from 100 mm to 10 atmospheres.

The reaction is generally carried out without the use of solvents or diluents. It is also possible however to use inert high boiling point hydrocarbons such as perhydronaphthalene, tetrahydronaphthalene, dimethylformamide or N-methylpyrrolidone as solvents or diluents.

It is advantageous to use from 1 to 5 moles of starting material (III) for each mole of starting material (II). Particularly good results are obtained when from 1.2 to 2.5 moles of starting material (III) is used for each mole of starting material (II).

The process according to the invention may be carried out for example by placing a mixture of starting materials (II) and (III) in a reactor and heating the mixture to the said temperatures. It is easy to detect the end of the reaction by the end of the elimination of carbon dioxide. The reaction mixture, after any solvent used has been distilled off, is then processed by conventional methods, for example by fractional distillation. Unreacted starting materials may be returned to the reaction. It is also possible to adapt the reaction to continuous operation in a simple way.

Substances prepared by the process according to the invention are odorants and have a fresh, fruity odor. They are also suitable as starting materials for the synthesis of biologically active substances.

The process according to the invention is illustrated in the following Examples.

EXAMPLE 1

A mixture of 154 g of linalool and 174 g of methyl α-formylpropionate is heated to 150°C. The alcohol liberated is distilled off over a column during the reaction. The reaction temperature is slowly raised to 195°C during the reaction. After about 4 hours, elimination of methanol and carbon dioxide is over. The reaction mixture obtained is processed by fractional distillation. 151 g (81% of the theory) of 2,5,9-trimethyl-deca-4,8-dien-1-al is obtained which has a boiling point of 68° to 71°C at 0.8 mm and a refractive index $n_D^{25}$ = 1.4653. The product has a fresh, fruity odor.

EXAMPLE 2

A mixture of 63 g of 1-vinylcyclohexan-1-ol and 119 g of n-butyl α-formylpropionate is heated in the course of 8 hours beginning at 160°C up to 175°C— After elimination of n-butanol and carbon dioxide has ceased, the reaction mixture is fractionally distilled. 51 g (64% of the theory) of 2-methyl-4-cyclohexyl-dienebutan-1-al is obtained having a boiling point of 56° to 64°C at 0.4 mm and a refractive index $n_D^{25}$ = 1.4678.

EXAMPLE 3

A mixture of 77 g of 3,7-dimethylocta-1,7-dien-3-ol and 87 g of methyl α-formylpropionate is heated for 3 hours at temperatures beginning at 150°C and rising to 195°C. 74 g (80% of the theory) of 2,5,9-trimethyl-deca-4,9-dien-1-al is obtained by fractional distillation of the reaction mixture. It has a boiling point of 69° to 76°C at 0.2 mm and a refractive index $n_D^{25}$ = 1.4635.

EXAMPLE 4

A mixture of 93 g of 3,7-dimethyl-7-methoxyocta-1-en-3-ol and 87 g of methyl α-formylpropionate is heated for 2 hours at temperatures of from 155° to 197°C. The reaction mixture is fractionally distilled. 81 g (74% of the theory) of 2,5,9-trimethyl-9-methoxy-deca-4-en-1-al is obtained having a boiling point of 87° to 94°C at 0.4 mm and a refractive index $n_D^{25}$ = 1.4560.

EXAMPLE 5

A mixture of 78 g of 4-ethyloct-1-en-3-ol and 87 g of methyl α-formylpropionate is heated for 3 hours at temperatures of from 170° to 225°C. After elimination of methanol and carbon dioxide, the reaction mixture is fractionally distilled. 64 g (74% of the theory) of 6-ethyl-2-methyldeca-4-en-1-al is obtained having a boiling point of 65° to 68°C at 0.17 mm and a refractive index $n_D^{25}$ = 1.4445.

EXAMPLE 6

A mixture of 111 g of nerolidol and 87 g of methyl α-formylpropionate is heated for 3 hours at temperatures of from 175° to 195°C and then fractionally distilled. 85 g (68% of the theory) of 2,5,9,13-tetramethyltetradeca-4,8,12-trien-1-al is obtained having a boiling point of 105° to 109°C at 0.01 mm and a refractive index $n_D^{25}$ = 1.4813.

EXAMPLE 7

A mixture of 148 g of isophytol and 87 g of methyl α-formylpropionate is heated for 3 hours at temperatures of from 180° to 200°C. The reaction mixture is fractionally distilled. 105 g (65% of the theory) of 2,5,9,13,17-pentamethyloctadeca-4-en-1-al is obtained having a boiling point of 142° to 145°C at 0.02 mm and a refractive index $n_D^{25}$ = 1.4590.

We claim:

1. A process for the production of a pent-4-en-1-al of the formula:

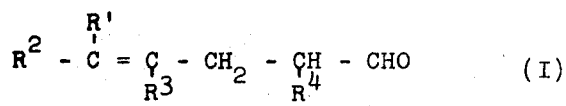

wherein R' is hydrogen or methyl, R² is a straight chain hydrocarbon radical having up to 13 carbon atoms in the chain which is either saturated or may contain olefinic double bonds and may carry methyl, ethyl or methoxy groups as substituents, R¹ and R² together may be a pentamethylene group, R³ is hydrogen and R⁴ is an alkyl radical having 1 to 4 carbon atoms, which process comprises reacting an alcohol of the formula:

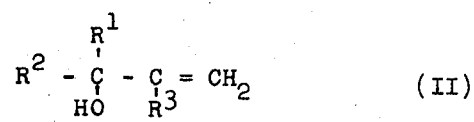

wherein R¹, R² and R³ have the meanings given above, with an α-formylcarboxylic ester of the formula:

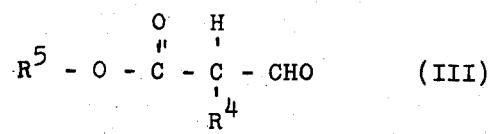

wherein R⁴ has the above meaning and R⁵ is an alkyl group having 1 to 4 carbon atoms, wherein from 1 to 5 moles of starting material (III) is used per mole of starting material (II) at a temperature of from 100° to 350°C.

2. A process as set forth in claim 1 wherein from 1.2 to 2.5 moles of starting material (III) is used per mole of starting material (II).

3. A process as set forth in claim 1 wherein the temperature used is from 120° to 220° C.

* * * * *